United States Patent
Yang (10) Patent No.: US 7,885,475 B2
(45) Date of Patent: Feb. 8, 2011

(54) MOTION ADAPTIVE IMAGE PROCESSING APPARATUS AND METHOD THEREOF

(75) Inventor: Seung-joon Yang, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1471 days.

(21) Appl. No.: 11/288,402

(22) Filed: Nov. 29, 2005

(65) Prior Publication Data

US 2006/0147090 A1 Jul. 6, 2006

(30) Foreign Application Priority Data

Dec. 30, 2004 (KR) .................. 10-2004-0116296

(51) Int. Cl.
G06K 9/36 (2006.01)
G06K 9/00 (2006.01)
G06K 9/46 (2006.01)
H04N 7/18 (2006.01)
H04N 5/228 (2006.01)
H04N 11/20 (2006.01)
H04N 5/14 (2006.01)

(52) U.S. Cl. .............. 382/236; 382/103; 382/107; 382/238; 382/294; 348/154; 348/155; 348/208.1; 348/451; 348/699

(58) Field of Classification Search .............. 382/107, 382/236, 238, 294; 348/154, 155, 400–421, 348/699, 208.04, 208.06, 208.13, 531.1, 348/451, 452, 518
See application file for complete search history.

(56) References Cited

U.S. PATENT DOCUMENTS

| | | | |
|---|---|---|---|
| 5,847,764 A * | 12/1998 | Murakami | 375/240.16 |
| 2003/0035594 A1 | 2/2003 | Kondo et al. | |
| 2003/0156301 A1 * | 8/2003 | Kempf et al. | 358/486 |
| 2003/0156644 A1 | 8/2003 | Song et al. | |
| 2003/0161403 A1 | 8/2003 | Yang | |

(Continued)

FOREIGN PATENT DOCUMENTS

EP 1 429 547 6/2004

(Continued)

OTHER PUBLICATIONS

Dutch Search Report dated Jul. 30, 2007 issued in Dutch Patent Application No. 1030729.

*Primary Examiner*—Anand Bhatnagar
*Assistant Examiner*—Randolph Chu
(74) *Attorney, Agent, or Firm*—Stanzione & Kim, LLP (57) ABSTRACT

A motion adaptive image processing apparatus includes a classifier to classify a current field of a sequence of in put fields into one or more class regions, a calculator to calculate a variance based on pixel values of pixels located in a predetermined region around a certain pixel of the current field, a threshold calculator to calculate a maximum variance and a minimum variance which are pre-set according to the one or more class regions, the threshold calculator calculating a threshold based on the calculated maximum variance and the minimum variance, a motion calculator to calculate a motion change of an image using a previous field and a next field of the current field in the sequence of the input fields, and a weight calculator to calculate the weight to be applied to the certain pixel based on the calculated threshold and the calculated motion change of the image.

17 Claims, 3 Drawing Sheets

U.S. PATENT DOCUMENTS

| | | |
|---|---|---|
| 2003/0163281 A1 | 8/2003 | Yang |
| 2004/0090523 A1* | 5/2004 | Kondo et al. .................. 348/46 |
| 2004/0228406 A1 | 11/2004 | Song |
| 2005/0175099 A1* | 8/2005 | Sarkijarvi et al. ...... 375/240.16 |
| 2007/0019107 A1* | 1/2007 | De Haan et al. ............. 348/452 |

FOREIGN PATENT DOCUMENTS

| | | |
|---|---|---|
| JP | 5-37961 | 2/1993 |
| JP | 9-319978 | 12/1997 |
| JP | 10-290450 | 10/1998 |
| JP | 2000-295621 | 10/2000 |
| KR | 2000-26757 | 5/2000 |

\* cited by examiner

MOTION ADAPTIVE IMAGE PROCESSING APPARATUS AND METHOD THEREOF

CROSS-REFERENCE TO RELATED APPLICATIONS

This application claims priority under 35 U.S.C. §119 from Korean Patent Application No. 2004-116296, filed on Dec. 30, 2004, in the Korean Intellectual Property Office, the entire contents of which are incorporated herein by reference.

BACKGROUND OF THE INVENTION

1. Field of the Invention

The present general inventive concept relates to a motion adaptive image processing apparatus and a method thereof. More particularly, the present general inventive concept relates to a motion adaptive image processing apparatus which calculates a weight to perform motion adaptive image processing based on a variance of pixel values of neighboring pixels of a target pixel, and a method thereof.

2. Description of the Related Art

Conventionally, a motion detection method uses a difference between pixels values of two images of previous and next fields with respect to a current field. If the difference between the pixel values of the two images is large, a motion is significant, and if the difference is small, the motion is trivial. However, an image may include a plurality of high-frequency components, such as an edge, or a noise may occur in the image. In this case, a significant motion is detected even if the image has no actual motion.

Since the motion in the image is not accurately detected, a motion adaptive image processing is not properly performed. Performing the motion adaptive image processing improperly degrades quality of the image.

SUMMARY OF THE INVENTION

The present general inventive concept provides a motion adaptive image processing apparatus and a method thereof to calculate a weight based on a variance which is calculated using neighboring pixels of a target pixel on which to apply a motion adaptive image processing, thereby accurately processing an image according to a motion of the image.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a motion adaptive image processing apparatus, comprising a classifier to classify a current field of a sequence of input fields into one or more class regions, a calculator to calculate a variance based on pixel values of pixels located in a predetermined region of the one or more class regions around a certain pixel of the current field, a threshold calculator to calculate a threshold based on a maximum variance and a minimum variance which are pre-set according to the one or more class regions, and the calculated variance, a motion calculator to calculate a motion change of an image using a previous field and a next field of the current field in the sequence of the input fields, and a weight calculator to calculate a weight to be applied to a motion adaptive processing of the certain pixel based on the calculated threshold and the calculated motion change of the image.

The classifier may classify the current field in the one or more class regions based on differences between pixel values of the current field and pixel values of at least one of the previous field and the next field. If the calculated variance is above the maximum variance, the threshold may be set to the maximum variance, if the calculated variance is below the minimum variance, the threshold may be set to the minimum variance, and if the calculated variance is above the minimum variance and below the maximum variance, the threshold may be set to the calculated variance.

The motion calculator may calculate the motion change of the image by using an estimated motion vector in at least one of the previous field and the next field.

The weight calculator may calculate the weight to be proportional to the calculated motion change if the calculated motion change is greater than the threshold and less than a predetermined value, and may calculate a constant weight as the weight if the motion change is greater than the predetermined value.

The foregoing and/or other aspects of the present general inventive concept may also be achieved by providing a motion adaptive image processing method, comprising classifying a current field of a sequence of input fields into one or more class regions, calculating a variance based on pixel values of pixels located in a predetermined region of the one or more class regions around a certain pixel of the current field, calculating a threshold based on a maximum variance and a minimum variance which are pre-set according to the one or more class regions, and the calculated variance, calculating a motion change of an image using a previous field and a next field of the current field in the sequence of the input fields, and calculating a weight to be applied to a motion adaptive image processing of the certain pixel based on the threshold and the motion change of the image.

The classifying of the current field may determine the one or more class regions based on a difference between pixel values of the current field and pixel values of at least one of the previous field and the next field.

During the threshold calculation, if the calculated variance is above the maximum variance, the threshold may be set to the maximum variance, if the calculated variance is below the minimum variance, the threshold may be set to the minimum variance, and if the calculated variance is above the minimum variance and below the maximum variance, the threshold may be set to the calculated variance.

In the motion calculation, the motion change of the image may be calculated using an estimated motion vector in at least one of the previous field and the next field.

In the weight calculation, the weight may be proportional to the calculated motion change if the calculated motion change is above the threshold and below a predetermined value, and the weight may be a constant weight if the motion change is above the predetermined value.

The foregoing and/or other aspects of the present general inventive concept may also be achieved by providing a motion adaptive image processing apparatus to selectively apply a motion adaptive image processing procedure to a sequence of images, the apparatus comprising an image divider unit to divide current images, previous images, and next images in a sequence of images into at least one current region of a predetermined size, and at least one corresponding previous region and at least one corresponding next region, a region analysis unit to receive each current region and corresponding previous region and next region from the image divider unit, to determine a motion class of the current region by comparing the current region with at least one of the previous region and the next region, to provide a range of a threshold according to the determined motion class, to calculate a dispersion value of pixels in the current region, and a weight calculating unit to calculate a motion change of the current image based on differences between corresponding pixel values of the previous image and the next image, to determine the threshold based on the provided range and the calculated dispersion value, and to determine a weight corresponding to a pixel from the current region to be applied to the motion adaptive image processing procedure based on the determined threshold and the calculated motion change.

The foregoing and/or other aspects of the present general inventive concept may also be achieved by providing motion image processing apparatus, comprising a motion calculator to determine a motion change between a current field of an image and with respect to at least one neighboring field and to determine whether the motion change is actual motion not caused by high frequency components or noise, and a weight calculator to select a weight that is proportional to the motion change when the motion change is the actual motion change not caused by high frequency components or noise, to select a constant weight when the motion change is not the actual motion change and is caused by high frequency components or noise, and to select zero as a weight when no motion change is determined to occur.

The foregoing and/or other aspects of the present general inventive concept may also be achieved by providing a method of selectively applying a motion adaptive image processing procedure to a sequence of images including a previous image, a current image, and a next image, the method comprising determining a motion class of a predetermined region of the current image by comparing with at least one of a corresponding predetermined region of the previous image and a corresponding predetermined region of the next image, providing a range of a threshold according to the determined motion class, calculating a dispersion value of pixels in the predetermined region of the current image, calculating a motion change of the predetermined region of the current image based on differences between corresponding pixel values of the corresponding predetermined region of the previous image and the corresponding predetermined region of the next image, determining the threshold based on the range and the calculated dispersion value, and determining a weight corresponding to a pixel from the predetermined region of the current image to be applied to the motion adaptive image processing procedure based on the threshold and the calculated motion change.

The foregoing and/or other aspects of the present general inventive concept may also be achieved by providing a method of selectively applying a motion adaptive image processing procedure to a sequence of images, the method comprising determining a weight determining a weight corresponding to a pixel from a current image to be applied to a motion adaptive image processing according to a motion change calculated based on comparing the current image with a previous image previous to the current image in the sequence of images and a next image next to the current image in the sequence of images.

The foregoing and/or other aspects of the present general inventive concept may also be achieved by providing a computer readable storage medium having executable codes to perform a method of selectively applying a motion adaptive image processing procedure to a sequence of images, the method comprising determining a weight determining a weight corresponding to a pixel from a current image to be applied to a motion adaptive image processing according to a motion change calculated based on comparing the current image with a previous image previous to the current image in the sequence of images and a next image next to the current image in the sequence of images.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
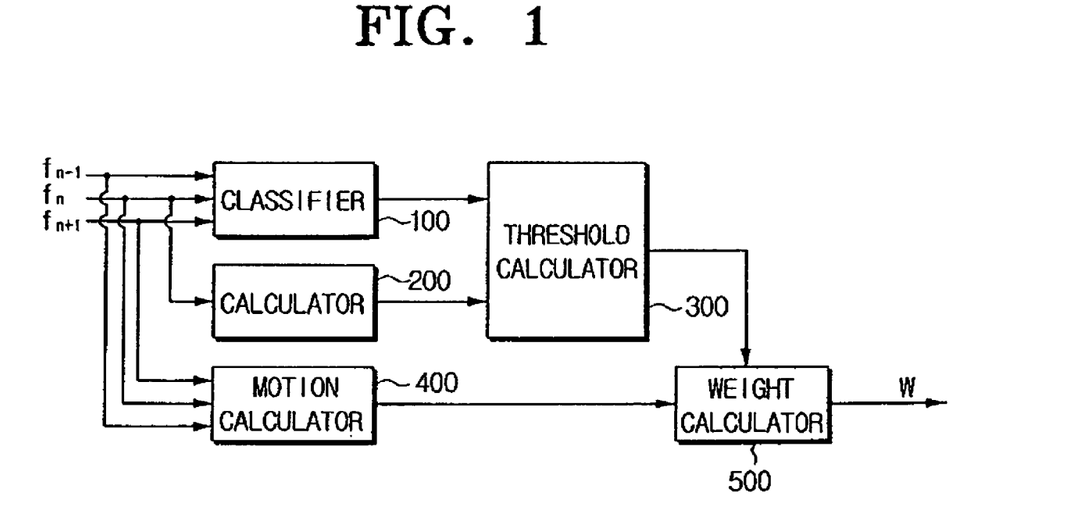
FIG. 1 is a block diagram illustrating a motion adaptive image processing apparatus according to an embodiment of the present general inventive concept.

FIG. 1 is a block diagram illustrating a motion adaptive image processing apparatus according to an embodiment of the present general inventive concept. Motion adaptive image processing refers to a variety of image processing methods, such as adaptive morphologic filtering and image adaptive interlacing, that are applied to an image signal having a sequence of images to enhance quality of the image by considering motion effects.

Referring to FIG. 1, the motion adaptive image processing apparatus according to the present embodiment comprises a classifier 100, a calculator 200, a threshold calculator 300, a motion calculator 400 and a weight calculator 500.

The classifier 100 classifies a current field ($f_n$) of a sequence of input fields into one or more class regions each having a predetermined size based on differences between pixel values of pixels of the current field ($f_n$) and corresponding pixel values of the pixels in previous ($f_{n-1}$) and/or next ($f_{n+1}$) fields of the current field ($f_n$). The current field ($f_n$) of the predetermined size may be a portion of an input image identified according to predetermined rules or may be the entire input image. The class region classification includes a still image, a motion image, and a flickering image. A maximum variance or a maximum standard deviation of the pixel values and a minimum variance or a minimum standard deviation of the pixel value are determined according to the class region in which the current field is classified.

The calculator 200 calculates a variance using pixels located in a predetermined region of the one or more class regions around a target pixel to which the motion adaptive processing is applied. The variance of the predetermined region of the current field ($f_n$) is calculated based on the following equation.

$$\sigma^2 = E[(f(x,y,k)-\mu)^2] \quad \text{[Equation 1]}$$

where $\sigma^2$ denotes a variance, $f(x, y, k)$ denotes pixel values of pixels in the predetermined region (x and y are pixel coordinates, k is a time index corresponding to the current field), $\mu$ denotes a mean pixel value of the predetermined region, and E denotes an expectation operation. The expectation operation may be a statistical average over the pixels in the predetermined region. A standard deviation $\sigma$, which is the square root of the variance $\sigma^2$, may be used instead of the variance $\sigma^2$. Other dispersion values characterizing a pixel value distribution may be used besides the standard deviation and the variance, to be compared with a corresponding ranges according to the class region. In Equation 1, the variance $\sigma^2$ of the predetermined region is calculated by applying the expectation operation E to the square of differences between the pixel values of the pixels in the predetermined region and the mean pixel value $\mu$ of the predetermined region.

The threshold calculator 300 calculates a threshold based on the results of the classifier 100 and the calculator 200. The threshold is used to calculate a weight which is applied in the motion adaptive image processing. The threshold is calculated based on the following equations.

$$Th=\sigma_{max}, \sigma>\sigma_{max} \qquad \text{[Equation 2]}$$

$$Th=\sigma_{min}, <\sigma<\sigma_{max} \qquad \text{[Equation 3]}$$

$$Th=\sigma_{min}, \sigma<\sigma_{min} \qquad \text{[Equation 4]}$$

where Th denotes the threshold, $\sigma$ denotes the standard deviation of the pixels values of the pixels in the predetermined region, $\sigma_{min}$ denotes the minimum standard deviation, and $\sigma_{max}$ denotes the maximum standard deviation. The minimum standard deviation $\sigma_{min}$ and the maximum standard deviation $\sigma_{max}$ each have different values depending on the class region of the predetermined region determined by the classifier 100. The maximum standard deviation $\sigma_{max}$ and the minimum standard deviation $\sigma_{min}$ may be pre-set by the threshold calculator 300 according to the class region. For example, if an image is classified as a still image, the maximum and minimum standard deviations $\sigma_{max}$ and $\sigma_{min}$ of the image are less than the maximum and minimum standard deviations $\sigma_{max}$ and $\sigma_{min}$ of an image that is classified as a motion image. The classifier 100 provides the results of the classification to the threshold calculator 300 such that the threshold calculator 300 can compare the standard deviation $\sigma$ of the pixel values of the pixels in the predetermined region of the current field ($f_n$) with an appropriate minimum standard deviation $\sigma_{min}$ and an appropriate maximum standard deviation $\sigma_{max}$.

According to the equations 2 to 4, if the standard deviation $\sigma$ of the pixels in the predetermined region calculated by the calculator 200 is above the maximum standard deviation $\sigma_{max}$, which may be pre-set according to the class region of the predetermined region, the threshold is set to the maximum standard deviation $\sigma_{max}$. If the standard deviation $\sigma$ of the predetermined region calculated by the calculator 200 is below the minimum standard deviation $\sigma_{min}$, the threshold Th is set to the minimum standard deviation $\sigma_{min}$. If the standard deviation $\sigma$ of the predetermined region calculated by the calculator 200 is above the minimum standard deviation $\sigma_{min}$ and below the maximum standard deviation $\sigma_{max}$, the threshold Th is set to the standard deviation $\sigma$ of the predetermined region.

Alternatively, the threshold Th may be calculated based on the following equations instead of the equations 2 to 4.

$$Th=\sigma_{max}, \psi(\sigma)>\sigma_{max} \qquad \text{[Equation 5]}$$

$$Th=\psi(\sigma), \sigma_{min}<\sigma<\sigma_{max} \qquad \text{[Equation 6]}$$

$$Th=\sigma_{min}, \psi(\sigma)<\sigma_{min} \qquad \text{[Equation 7]}$$

wherein Th denotes a threshold, $\psi(\sigma)$ denotes a predetermined function value of the standard deviation $\sigma$ of the predetermined region in the current field ($f_n$) calculated by the calculator 200, $\sigma_{min}$ denotes the minimum standard deviation, and $\sigma_{max}$ denotes the maximum standard deviation. The predetermined function $\psi(\sigma)$ may be a first order polynomial function. The minimum standard deviation $\sigma_{min}$ and the maximum standard deviation $\sigma_{max}$ each have different values depending on the class region of the predetermined region determined by the classifier 100, and are pre-set by the threshold calculator 300.

Similar to the equations 2 to 4, according to the equations 5 to 7, if the predetermined function value of the standard deviation $\sigma$ of the predetermined region calculated by the calculator 200 is greater than the maximum standard deviation $\sigma_{max}$ which is pre-set according to the class region of the predetermined region determined by the classifier 100, the threshold Th is set to the maximum standard deviation $\sigma_{max}$. If the predetermined function value is less than the minimum standard deviation $\sigma_{min}$, the threshold is set to the minimum standard deviation $\sigma_{min}$. If the standard deviation a of the predetermined region calculated by the calculator 200 is greater than the minimum standard deviation $\sigma_{min}$ and less than the maximum standard deviation $\sigma_{max}$, the predetermined function value of the standard deviation $\sigma$ of the predetermined region is determined to be the threshold Th.

Since the maximum standard deviation $\sigma_{max}$ and the minimum standard deviation $\sigma_{min}$ of a still image are less than the maximum standard deviation $\sigma_{max}$ and the minimum standard deviation $\sigma_{min}$ of a motion image, the threshold Th of the still image calculated by the threshold calculator 300 is within a lower range than the threshold Th of the motion image.

The motion calculator 400 calculates a motion change $\Delta$ of an image using the sequence of input fields. The motion change is calculated based on the following equation.

$$\Delta = \sum |f(x, y, k-1) - f(x, y, k+1)| \qquad \text{[Equation 8]}$$

where $\Delta$ denotes a motion change, f(x, y, k−1) and f(x, y, k+1) are pixel values of the previous field ($f_{n-1}$) and the next field ($f_{n+1}$) according to the time index k. When three consecutive fields are input to apply a motion adaptive image processing to the current field, the motion change $\Delta$ is calculated based on differences between pixel values of the previous field ($f_{n-1}$) and the next field ($f_{n+1}$).

An estimated motion vector ($v_x$, $v_y$), may be determined using a motion estimation and compensation procedure, for example by tracking features in the sequence of images in consecutive fields of an image. When the motion adaptive image processing is performed using the motion estimation and compensation, the motion change $\Delta$ may be calculated based on one of the following equations:

$$\Delta = \sum |f(x+v_x, y+v_y, k-1) - f(x, y, k+1)| \qquad \text{[Equation 9]}$$

$$\Delta = \sum |f(x, y, k-1) - f(x+v_x, y+v_y, k+1)| \qquad \text{[Equation 10]}$$

$$\Delta = \sum |f(x-v_x, y-v_y, k-1) - f(x+v_x, y+v_y, k+1)| \qquad \text{[Equation 11]}$$

where $\Delta$ denotes the motion change, f(x, y, k−1) and f(x, y, k+1) are pixel values of the previous field ($f_{n-1}$) and the next field ($f_{n+1}$) of a pixel of coordinates x and y according to the time index k.

In order to perform the motion adaptive image processing using the motion estimation and compensation, the motion change $\Delta$ is calculated after the estimated motion vector ($v_x$, $v_y$) is applied to the previous field ($f_{n-1}$) or/and the next field ($f_{n+1}$) to determine the motion change $\Delta$. That is, after the estimated motion vector ($v_x$, $v_y$) is applied to pixel values of the previous field ($f_{n-1}$) or the next field ($f_{n-1}$) or after the estimated motion vector ($v_x$, $v_y$) is applied to the pixel values of the previous field ($f_{n-1}$) and the next field ($f_{n+1}$), the motion change $\Delta$ is calculated using the difference between pixels values of the previous field ($f_{n-1}$) and the next field($f_{n+1}$).

The weight calculator 500 calculates a weight to be applied to the motion adaptive image processing based on the motion change $\Delta$ calculated by the motion calculator 400 and the threshold Th calculated by the threshold calculator 300. The weight is applied to the motion adaptive image processing if the motion change $\Delta$ is greater than the threshold Th calculated by the threshold calculator 300.

Also, if the motion change $\Delta$ is above a predetermined value, the weight to be applied to the motion adaptive image processing has a constant value. In other words, with respect to an image having a significant motion, the weight that is proportional to the motion change $\Delta$ is not applied. If the motion change $\Delta$ is above the predetermined value, the constant value weight is applied. Accordingly, if the image is detected to have the significant motion due to the presence of noise or an edge, the image is not processed according to the calculated motion change $\Delta$ and the constant weight is applied so that a proper motion adaptive image processing can be performed according to the motion change $\Delta$.

Figure 2:
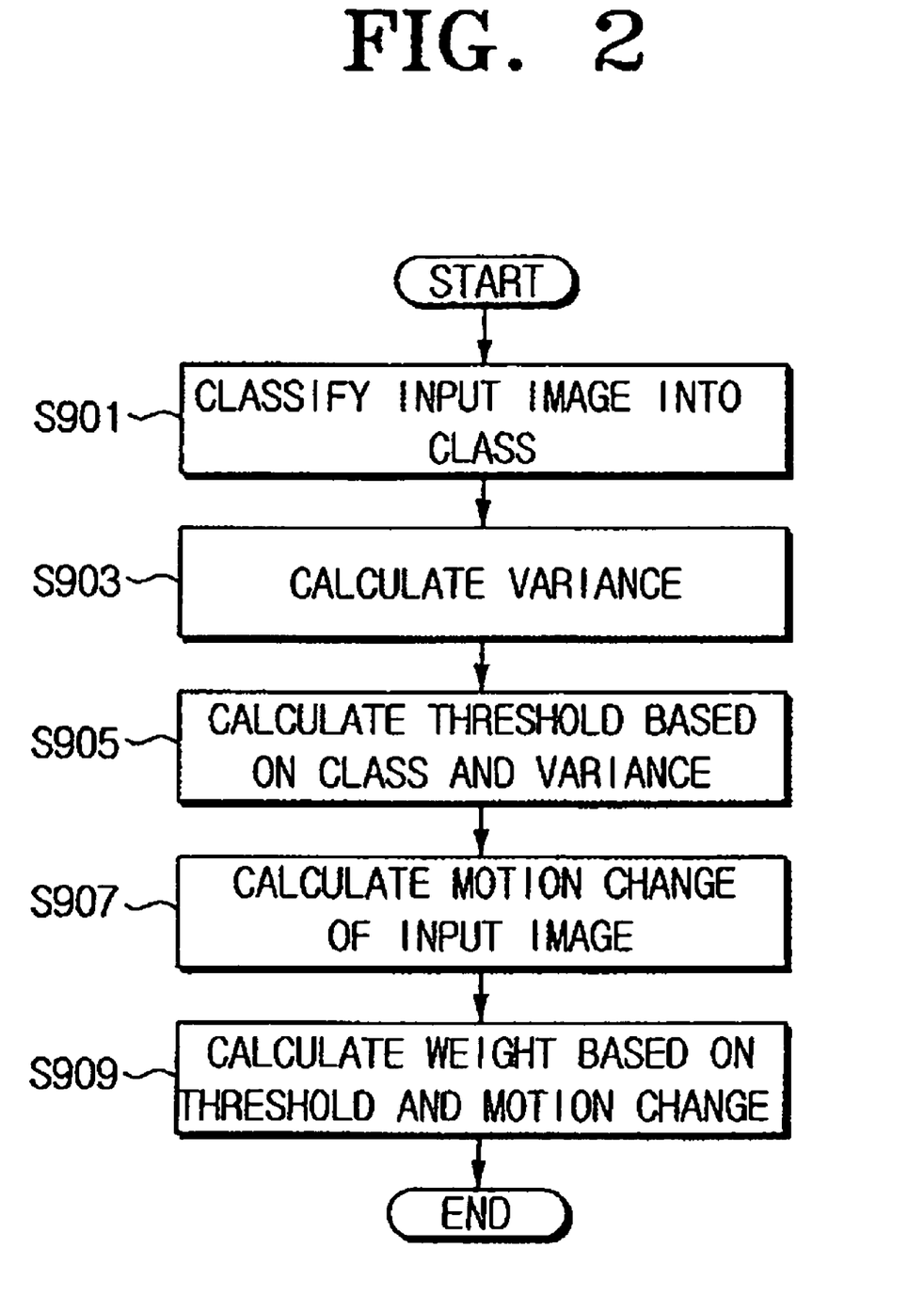
FIG. 2 is a flowchart illustrating a motion adaptive image processing method according to an embodiment of the present general inventive concept.

FIG. 2 is a flowchart illustrating a motion adaptive image processing method according to an embodiment of the present general inventive concept. The method of FIG. 2 may be performed by the motion adaptive image processing apparatus of FIG. 1. Accordingly, for illustration purposes, the method of FIG. 2 is described below with reference to FIGS. 1 and 2.

Referring to FIG. 2, a current field of a sequence of input fields in an input image is classified into at least one class region at operation S901. The input image is classified based on a difference between pixel values of consecutive input fields. The types of class regions include a still image, a motion image, and a flickering image. Other types of class regions may also be used. A maximum variance or a maximum standard deviation and a minimum variance or a minimum standard deviation are determined according to the type of class region.

For example, if the input image is classified as a motion image, the maximum variance and the minimum variance of the image have relatively higher values than the maximum variance and the minimum variance of a still image. The maximum variance or the maximum standard deviation and the minimum variance or the minimum standard deviation are used to calculate a threshold which is used when a weight is applied to a motion adaptive image processing.

Next, a variance is calculated to determine the threshold which is used when the weight is applied to the motion adaptive image processing at operation S903. The variance is calculated using pixels located in a predetermined region around a target pixel on which to apply the motion adaptive processing. The variance is obtained by calculating a mean pixel value of the predetermined region and obtaining a sum of squares of differences between pixel values of pixels in the predetermined region and the calculated mean pixel value. A standard deviation, which is a square root of the variance, can be used instead of the variance.

If the target pixel has a relatively more significant motion than motions of neighboring pixels, the calculated variance is significant. However, the input image may appear to have a significant motion due to the presence of noise or an edge. Therefore, even if the calculated variance is large, the motion adaptive image processing is not performed according to calculated motion change $\Delta$, and instead it is performed with a constant weight.

Next, the threshold is calculated based on the type of class region and the calculated variance at operation S905. The threshold is used to calculate the weight to be applied to the motion adaptive image processing. The maximum variance or the maximum standard deviation and the minimum variance or the minimum standard deviation may be pre-set according to the type of class region of the input image.

The threshold is determined by comparing the calculated variance of the predetermined region with the maximum variance and the minimum variance pre-set according to the type of class region of the input image. If the variance of the predetermined region is above the maximum variance, the maximum variance is determined to be the threshold, and if the variance of the predetermined region is below the minimum variance, the minimum variance is determined to be the threshold. If the variance of the predetermined region is above the minimum variance and below the maximum variance, the variance of the predetermined region is determined to be the threshold. Thus, the threshold indicates a representative variance for the predetermined region of the current field centered on the target pixel. Alternatively, the threshold may be determined based on the standard deviation of the predetermined region.

Instead of using the type of class region and the variance of the predetermined region, the threshold may be calculated based on a predetermined function value of the variance of the predetermined region.

Next, a motion change is calculated using the previous and next input fields at operation S907. The motion change is calculated based on a difference between pixels values of the previous field and the next field of the current field to which the motion adaptive image processing is applied.

When the motion adaptive image processing is performed using a motion estimation and compensation, the motion change is calculated after applying an estimated motion vector to the previous field and the next field. That is, the motion change is calculated using the difference between the pixel values of the previous field and the next field after applying the estimated motion vector to the pixel value of the previous field or the next field or after applying the estimated motion vector to the pixel values of the previous field and the next field.

Next, the weight to be applied to the motion adaptive image processing is calculated based on the calculated threshold and motion change at operation S909. The calculated weight is applied to the motion adaptive image processing when the motion change is above the threshold and below a predetermined value. However, if the motion change is above the predetermined value, a constant weight is applied to the motion adaptive image processing, since the motion change above the predetermined value indicates that noise or an edge occurs in the input image.

In other words, when the input image is determined to have a relatively significant motion due to noise or an edge, the input image is not processed according with a weight proportional to the calculated motion change but is processed with the constant weight. Processing with the constant weight when the image is determined to have the relatively significant motion prevents overcorrecting for motion effects when applying the motion adaptive image processing if the significant motion may have been detected due to the presence of noise or an edge.

Figure 3:
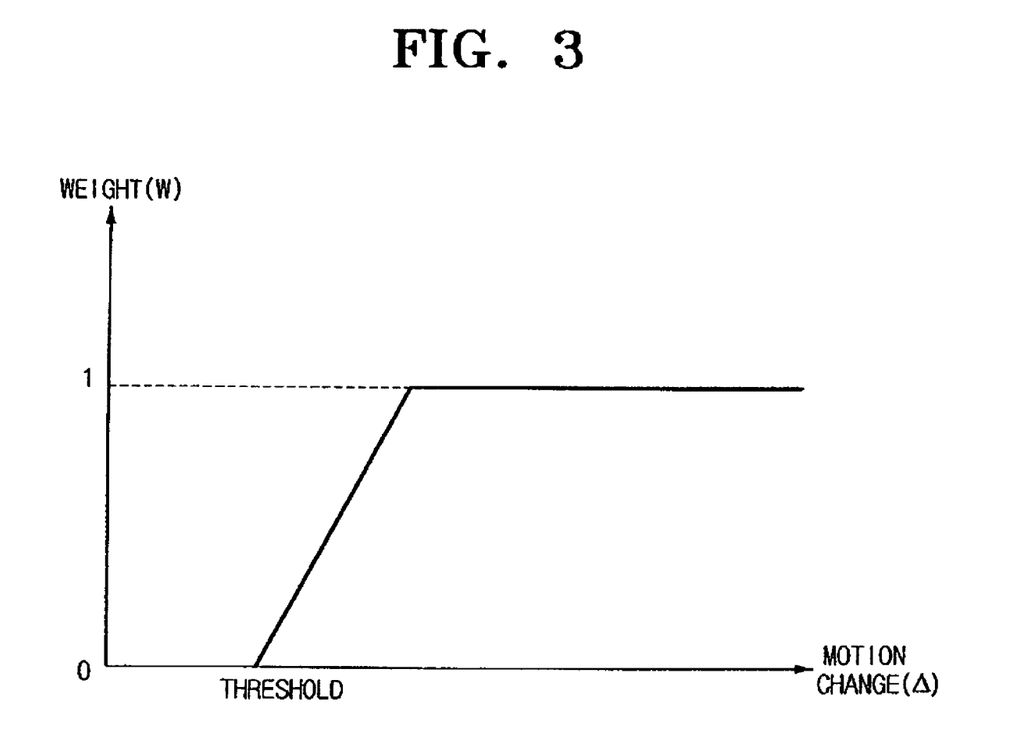
FIG. 3 is a graph illustrating a weight calculated according to a motion change by a weight calculator of the motion adaptive image processing apparatus of FIG. 1.

FIG. 3 is a graph illustrating variation of the weight calculated by the weight calculator 500 of FIG. 1 according to the motion change. The horizontal axis represents a motion change (Δ) and the vertical axis represents a weight W applied according to the motion change of an image during the motion adaptive image processing.

Referring to FIG. 3, the weight varies as a function of the motion change when the motion change is above the threshold and below a predetermined value. A constant weight is applied if the motion change is above the predetermined value. If the motion change is below the threshold the applied weight is zero, that is, the motion adaptive image processing has no effect because it is likely that the detected motion is not an actual motion.

If an image includes many noises or high frequency components, the image may appear to have a significant movement. In this case, if the image is processed in the same way as when a moving object actually has a significant movement, the image quality is degraded. However, since noise or high frequency typically appears to be significant motion, the image degradation may be prevented by limiting the value of weight. Therefore, if a significant motion change is calculated due to the edge or noise, the weight is not applied in proportion to the motion change, and instead, a constant weight '1' is applied to the motion adaptive image processing. The predetermined value at which the constant weight is applied may be set for all class regions or may be specific to each class region.

The different thresholds are calculated depending on the type of class region such that the weight is applied proportional to the motion change. For example, if an input image is a still image, a low threshold is calculated and thus, the weight is applied even if there is a trivial motion change.

According to various embodiments of the present general inventive concept, since an image having a significant motion change according to an actual motion is more accurately detected by using the variance with respect to the pixel values of the predetermined region, the image quality is enhanced by preventing improper application of a motion adaptive image processing.

The embodiments of the present general inventive concept can be embodied in software, hardware, or a combination thereof. In particular, some embodiments can be computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, DVDs, etc.). The computer readable recording medium can also be distributed over network coupled computer systems so that the computer programs are stored and executed in a distributed fashion.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A motion adaptive image processing apparatus to selectively apply a motion adaptive image processing procedure to a sequence of images, the apparatus comprising: an image processor comprising:
   an image divider unit to divide current images, previous images and next images in a sequence of images into at least one current region of a predetermined size, at least one corresponding previous region, and at least one corresponding next region, respectively;
   a region analysis unit to receive each current region and corresponding previous region and next region from the image divider unit, to determine a motion class of the current region by comparing the current region with at least one of the previous region and the next region, to provide a range of a threshold according to the determined motion class, and to calculate a dispersion value of pixels in the current region; and
   a weight calculating unit to calculate a motion change of the current image based on differences between corresponding pixel values of the previous image and the next image, to determine the threshold based on the provided range and the calculated dispersion value, and to determine a weight corresponding to a pixel from the current region to be applied to the motion adaptive image processing procedure based on the determined threshold and the calculated motion change.

2. The motion adaptive image processing apparatus as claimed in claim 1, wherein the motion class determined for the current region by the region analysis unit is one of a still image, a motion image and a flickering image.

3. The motion adaptive image processing apparatus as claimed in claim 1, wherein the calculated dispersion value is one of a variance and a standard deviation calculated for pixel values of pixels in the each region.

4. The motion adaptive image processing apparatus as claimed in claim 1, wherein the weight calculating unit determines the threshold to be the calculated dispersion value if the calculated dispersion value is in the range corresponding to the determined motion class, the threshold is a lowest value in the range if the calculated dispersion value is not greater than the range, and the threshold is a highest value in the range if the calculated dispersion value is above the range.

5. The motion adaptive image processing apparatus as claimed in claim 1, wherein the weight calculating unit determines the weight to be applied to the motion adaptive image processing procedure such that the weight is zero when the motion change is less than the threshold, the weight is proportional to the motion change when the motion change is greater than the threshold but less than a predetermined value, and the weight has a constant value when the motion change is greater than the predetermined value.

6. The motion adaptive image processing apparatus as claimed in claim 1, wherein the weight calculating unit determines an estimated motion vector and applies an estimated motion using the estimated motion vector to pixels of the previous image before calculating the motion change of the current image based on differences between corresponding pixel values of the previous image and the next image.

7. The motion adaptive image processing apparatus as claimed in claim 1, wherein the weight calculating unit determines an estimated motion vector and applies an estimated motion using the estimated motion vector to pixels of the next image before calculating the motion change of the current image based on differences between corresponding pixel values of the previous image and the next image.

8. The motion adaptive image processing apparatus as claimed in claim 1, wherein the weight calculating unit determines an estimated motion vector and applies an estimated motion using the estimated motion vector to pixels of the previous image and pixels of the next image before calculating the motion change of the current image based on differences between corresponding pixel values of the previous image and the next image.

9. A method of selectively applying a motion adaptive image processing procedure to a sequence of images including a previous image, a current image and a next image in a motion adaptive image processing apparatus, the method comprising:

determining a motion class of a predetermined region of the current image in a motion adaptive image processing apparatus by comparing at least one of a corresponding predetermined region of the previous image and a corresponding predetermined region of the next image;

providing a range of a threshold according to the determined motion class;

calculating a dispersion value of pixels in the predetermined region of the current image;

calculating a motion change of the predetermined region of the current image based on differences between corresponding pixel values of the corresponding predetermined region of the previous image and the corresponding predetermined region of the next image;

determining the threshold based on the range and the calculated dispersion value; and determining a weight corresponding to a pixel from the predetermined region of the current image to be applied to the motion adaptive image processing procedure based on the threshold and the calculated motion change.

10. A method of selectively applying a motion adaptive image processing procedure to a sequence of images in a motion adaptive image processing apparatus, the method comprising:

determining a motion class of a predetermined region of a current image in the motion adaptive image processing apparatus by comparing at least one of a corresponding predetermined region of a previous image and a corresponding predetermined region of a next image;

calculating a variance of pixels in the predetermined region of the current image;

determining a threshold range based on the calculated variance; and determining a weight corresponding to a pixel from the current image to be applied to the motion adaptive image processing procedure in the motion adaptive image processing apparatus according to a determined threshold based on the threshold range and a motion change calculated based on a comparison between the current image and a previous image of the current image in the sequence of images and between the current image and a next image of the current image in the sequence of images.

11. The method as claimed in claim 10, wherein the motion adaptive image processing is not applied if the motion change is less than a low threshold, and a constant weight is applied to the motion adaptive image processing if the motion change is greater than a high threshold.

12. The method as claimed in claim 10, wherein the determining of the weight comprises applying the determined weight to a pixel value of the pixel calculated according to the applied motion adaptive image processing so that the pixel value is changed.

13. The method as claimed in claim 10, wherein a pixel value of the pixel is not changed when the determined weight is applied to the motion adaptive image processing if the motion change is less than a first threshold, and the pixel value of the pixel is not changed proportional to the motion change when the determined weight is applied to the motion adaptive image processing if the motion change is greater than the first threshold and less than a second threshold.

14. A non-transitory computer readable storage medium having executable codes to perform a method of selectively applying a motion adaptive image processing procedure to a sequence of images, the method comprising:

determining a motion class of a predetermined region of a current image in the motion adaptive image processing apparatus by comparing at least one of a corresponding predetermined region of a previous image and a corresponding predetermined region of a next image;

calculating a variance of pixels in the predetermined region of the current image;

determining the threshold range based on the calculated variance; and determining a weight corresponding to a pixel from the current image to be applied to the motion adaptive image processing procedure according to a determined threshold based on the threshold range and a motion change calculated based on a comparison between the current image and a previous image previous to the current image in the sequence of images and between the current image and a next image next to the current image in the sequence of images.

15. The method as claimed in claim 10, wherein the motion change is calculated based on a difference between pixel values of the previous field and the next field.

16. The method as claimed in claim 10, wherein the motion change is calculated after applying an estimated motion vector to the pixel value of the previous field or the next field.

17. The method as claimed in claim 14, wherein the motion change is calculated after applying an estimated motion vector to the pixel values of the previous field and the next field.

* * * * *